Patented Sept. 5, 1939

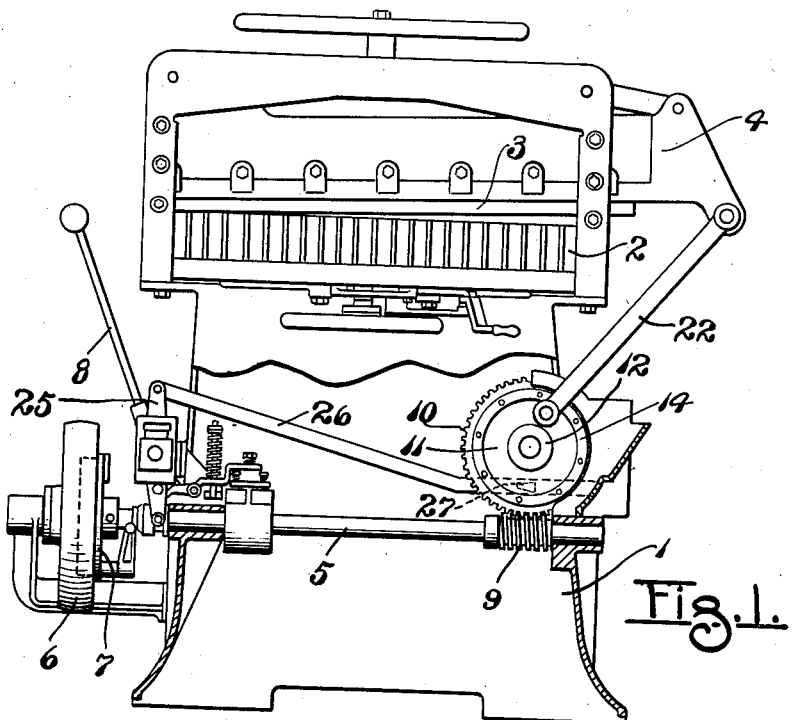
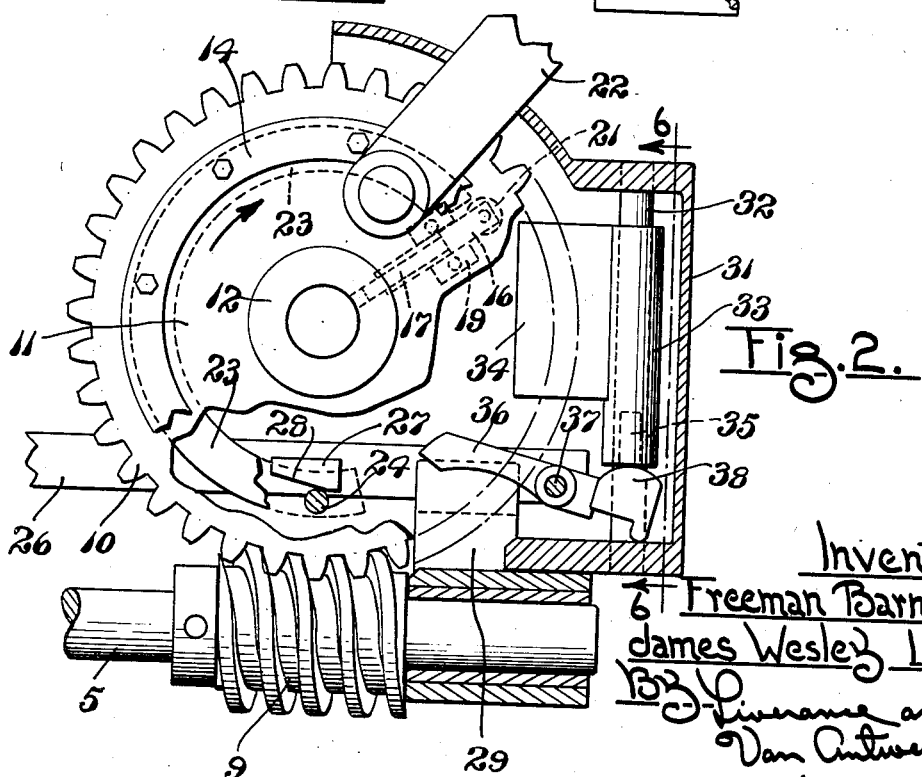

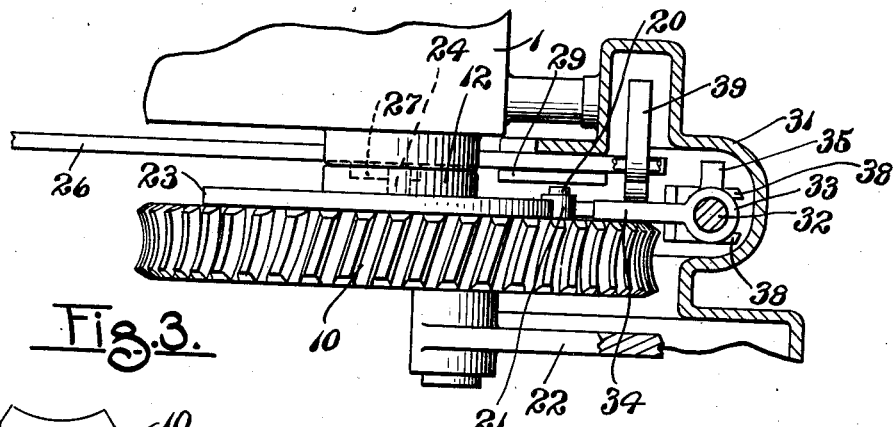
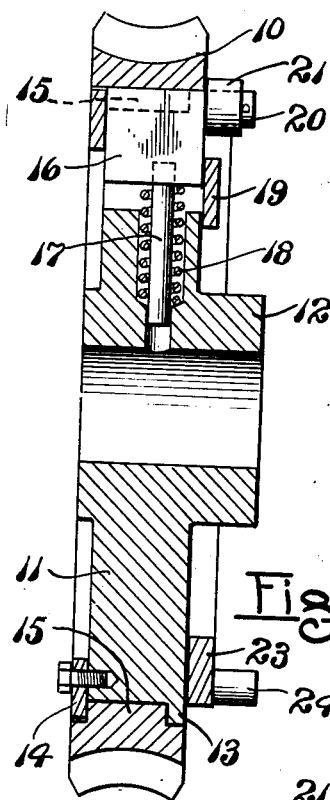
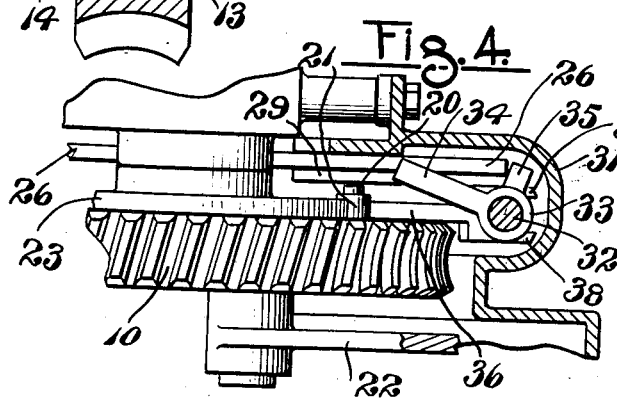
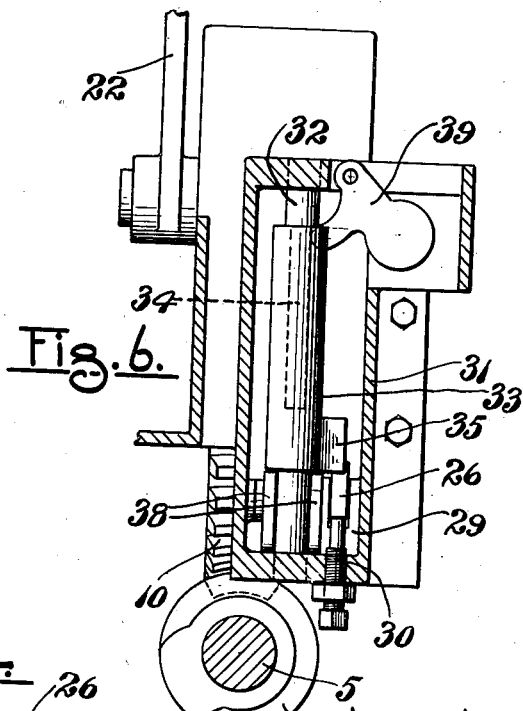

2,171,841

UNITED STATES PATENT OFFICE 2,171,841

SAFETY DRIVE MECHANISM

Freeman Barney, Spring Lake, and James Wesley Lee, Grand Haven, Mich., assignors to The Challenge Machinery Company, Grand Haven, Mich., a corporation of Michigan Application September 1, 1937, Serial No. 161,951

14 Claims. (Cl. 192—138)

This invention relates to a safety mechanism, preferably in connection with the operation of paper cutting machines, though not exclusively limited thereto.

In the operation of paper cutting machines it is desirable that the cutting knife make one cutting operation only when the power has been connected to drive the machine, any succeeding operation necessitating a manual operation of the clutch operating lever or handle. There has been previously patented to Freeman Barney a brake and clutch mechanism having No. 1,836,104 patented December 15, 1931, designed to operate so that when the clutch between the power and the machine has been disengaged it cannot again be brought into engagement to operate the machine until it has been determined that a further operation of the machine is to be had, this being done by a manual operation of the clutch operating lever to reengage the clutch. However, in the operation of the machine, an operator at times will throw the clutch reengaging lever to a position to reengage the clutch and will hold it in such positions many times accidentally or inadvertently; or sometimes there may be a part of the machine break or get out of order so that the machine would normally continue in operation, and with our invention herein it is an object thereof to prevent continued operation of the cutting knife even though the clutch is in engaged position and connects the power driving the machine with the driving shaft thereof.

The invention consists of many novel constructions, and arrangements of parts and combinations for practically and effectively insuring that in the operation of the paper cutting machine one cutting movement of a knife and its return to the position from which it begins the cutting movement only shall take place, irrespective of the maintenance of the connecting clutch in an operative relation between the driving pulley and the main driving shaft of the machine.

Many other objects and purposes than those stated at this time will appear on understanding of the invention from the following description, taken in connection with the accompanying drawings, in which, Fig. 1 is an elevation of a paper cutting machine to which our invention is applied, some parts of the machine being broken away and shown in section.

Fig. 2 is an enlarged elevation of the mechanism interposed between the driving shaft of the machine and the paper cutting knife operated thereby, certain parts being broken away and shown in section.

Fig. 3 is a plan view of the construction shown in Fig. 2.

Fig. 4 is a fragmentary plan similar to that shown in Fig. 3 but with some of the parts in different positions.

Fig. 5 is a substantially vertical section through the combined worm ring and an inner wheel forming one of the main elements of structure of the invention and showing the ring locked to said wheel, and Fig. 6 is a section and elevation substantially on the plane of line 6—6 of Fig. 2, looking in the direction indicated by the arrows.

Like reference characters refer to like parts in the different figures of the drawings.

The paper cutting machine has a supporting pedestal 1 at the upper portion of which a paper cutting mechanism indicated at 2 is mounted, which includes a cutting knife 3 mounted on a suitable movable elongated carrier 4, said carrier being mounted so that in the operation of the machine it moves the knife downwardly and longitudinally in cutting the paper, which may be operated upon by the knife in a pack or series of sheets located in superimposed relation one over the other. This paper cutter itself and the operating means therefor is old and well known and it is not necessary to show in detail or describe the specific structure thereof.

The paper cutter is driven by a shaft 5 which is mounted in suitable bearings on the pedestal. A pulley 6 is driven from any suitable line shaft source of power or otherwise and through the connection of a disengageable clutch 7 may be connected with or disengaged from the shaft 5. A hand lever 8 is used to operate the clutch to engage it or disengage it and to set a brake when the clutch is disengaged to stop the mechanism for operation. The structure of said brake and clutch mechanism is fully described in the Barney patent, No. 1,836,104 to which reference has been previously made.

A worm 9 is fixed to the shaft 5 and is in mesh with a ring 10 which has consecutive worm teeth around it, the ring in turn surrounding a wheel 11 having a hub 12 mounted on a suitable stud shaft for rotation. The wheel 11 at one side has a projecting annular rib 13 and at its opposite side has a retaining ring 14 bolted or otherwise suitably secured, there being formed a continuous annular groove around the wheel 11 between the member 13 and the projecting outer edge portions of the ring 14 as shown in Fig. 5. The worm ring 10 at its inner curved side is provided with a continuous annular projecting rib 15 which fits in said annular groove, the machining of the parts being such that the worm ring when free to do so may move freely around the wheel 11. At one point in the rib 15 a transverse slot or notch is cut adapted to receive a latching dog 16 from which a rod 17 extends radially inward and is guided in a suitable opening in the wheel 11, with a coiled spring 18 acting on the dog to normally push it outward and into the transverse slot made in the rib 15. The dog 16 is guided between the ring 14 at one side and a plate 19 at the opposite side of the wheel 11. A pin 20 projects laterally from the dog 16 at its outer end on which a roller 21 is mounted for rotation. Pressure inwardly on the roller 21 in a radial direction moves the dog inwardly until the roller comes against the outer edge of the plate 19 in which position the outer edge portion of the dog 16 will be free of the slot in rib 15 and worm ring 10 and the surrounding worm ring 13 disconnected from each other. A bar 22 connects the wheel 11 to the knife carrier 4 in the usual manner in machines of this character.

At the rear side of the wheel 11 is a partial ring 23 which extends through approximately 250° of a complete circle, the position and length of said partial ring 23 being shown in Fig. 2, there being a gap between the ends of said member 23 as indicated. This ring is located so that one end thereof (Fig. 2) is close to the roller 21 when the machine is stopped and so that its outer curved edge if continued would substantially coincide with the outer points of the roller 21 when said roller is pressed inwardly to unlatch the dog 16. A pin 24 extends inwardly from the wheel 11 and the member 23 at approximately 125° from the roller 21 and is adapted to be at its lowermost position when the operation of the cutting knife has stopped at the completion of one cycle of said knife, or as shown in Fig. 2.

Operation of the lever 8 to the right (Fig. 1) moves an arm 25 to the right and thereupon moves a bar 26 connected to said arm longitudinally. A block 27 is connected to a side of the bar 26 having an inclined under edge 28, as shown in Fig. 2 which, when the machine has stopped after a cutting operation lies directly above the pin 24. The free end portion of the bar 26 slides between the sides of a guide 29 and rides upon the upper end of a screw 30 threaded through the lower end of a housing 31 as shown in Fig. 6. The screw 30 is adjustable to different positions and may be locked in any position to which adjusted so as to properly position block 27 with its inclined under edge 28 with reference to the pin 24.

Within the housing 31 and beyond or to the right of the worm ring 10 a vertical rod 32 is located between the upper and lower sides of said housing. A sleeve 33 of less length than the rod 32 is rotatably and slidably mounted on said rod. A vane 34 projects from the sleeve 33 so as to be located in one of its positions, alongside the inner side of the wheel 11 and the worm ring 10, as in Fig. 3. A lug 35 also projects from the sleeve 33 at the lower end thereof at right angles to vane 34 and is in the path of movement of the outer end of the bar 26 whereby when the bar 26 is longitudinally moved to the right from the position of Fig. 3 to that in Fig. 4 it normally strikes the lug 35 and turns the sleeve and the vane 34 to the positions shown in Fig. 4. A lever 36 is pivotally mounted between its ends at 37 and at its outer end is bifurcated or divided to make two spaced apart sides 38 having curved upper edges one being located at each side of the lower part of the rod 32, whereby the lower end of the sleeve 33 rests upon the curved upper edges of the sides 38. The other end of the lever 36 has a curved end which is in the path of movement of the roller 21. In the upper end of the housing 31 a weighted lever 39 is pivotally mounted having a finger which comes against the inner side of the vane 34, the tendency of which is to move said vane to the position shown in Fig. 3.

In operation the operator moves the handle 8 (Fig. 1) to the right thereby moving the bar 26 in the same direction. The clutch at 7 is connected with the driving pulley 6 to drive the shaft 5 and operate the machine, the dog at 16 being seated in the recess in the rib 15. The rotation of the connected wheel 11 with the worm ring 10 continues for one revolution thereby operating the knife 3 downwardly and lengthwise and back to its upper initial position as shown in Fig. 1. Near the completion of the revolution the pin 24 comes against the end of the block 27 to move the bar 26 to the left and disconnect the clutch at 7 and put on the brake. If the operator has released the handle or lever 8 the machine is then brought to a stop after the completion of a single revolution of the connected wheel 11 and ring worm gear around it. The pin 24 engages against the end of the block 27 with the pin in a position higher than its lowermost position, whereby as the bar 26 is moved to the left and the free end thereof comes against the upper end of screw 30, said bar does not continue to lower. But, the pin 24 continues to lower until it passes underneath the block 27.

The vane 34 will have been moved to the position shown in Fig. 4, this occurring when the bar 26 is initially moved in throwing the clutch into engagement due to the end of the bar striking the lug 35. The roller 21 in that case will not engage the vertical edge of the vane 34 but will come to the lever 36, riding over the end thereof and turning it in a counterclockwise direction to elevate the sleeve 33 with its connected vane 34 and lug 35, and as the roller leaves the end of the lever 36 the outer edge of the curved member 23 comes against said lever 36 and retains it in the position to which it has been moved, thus holding sleeve 33 and connected parts in upper position.

In such upper position the lug 35 will have been moved above the end of the bar 26, and under the influence of the weighted member 39 engaging against the vane 34, said vane and connected parts will be moved to the position shown in Fig. 3. If, as may occur, some part of the normal declutching mechanism should fail to function, for example, the operator pressing on the handle or lever 8 to the right, the pin 24 striking the block 27 and breaking off, or if the clutch should freeze to the pulley 6 and there not be a disconnection of the power to the machine, the lever 36 being depressed by the curved member 23 and permitting the vane 34 to take the position shown in Fig. 3, on a continuance of rotation after a single revolution of the connected wheel 11 and ring gear 10 had taken place the roller 21 will engage the edge of the vane 34 and be moved radially inward to disconnect the wheel 11 and the ring gear 10. The space between the vertical edge of the vane 34 and the plate 19 on the wheel 11 is not sufficient to permit the roller 21 to pass and therefore after the dog 16 has been disengaged from the ring gear 10, the roller 21 will pinch between the edge of the vane 34 and the plate 19 positively preventing further rotation of the wheel 11. On such occurrence the ring gear 10 driven by the shaft 5 which is in turn driven from the pulley 6 will rotate freely about the wheel 11, but such wheel is stopped against movement and with it the knife 3.

With this construction therefore, there is insurance that, irrespective of what may happen in the machine, one revolution only of the wheel 11 will take place and one cutting cycle of the cutting knife 3 will be performed. This construction insures against continuous operation of the cutting knife in the event of parts of the machine becoming broken or loose or otherwise not performing in accordance with the way that they should perform. To reset the device for normal operation it is necessary to turn the wheel 11 backward a short distance so that the roller 21 will clear itself from the vane 34.

The safety mechanism described is to take care of extraordinary conditions. In the normal operation of the machine where the lever 8 is pushed over to the right and then released and the pin 24 strikes the block 27 at the completion of one revolution, the machine is thereupon stopped with one cycle only of the cutting knife having been performed. Machines of this character however, are dangerous in operation, particularly with relation to the movement of the cutting knife and every precaution must be taken to prevent undesired movements of the cutting to prevent undesired movements of the cutting knife. Such particularly is true at any time when the operator, thinking that the knife should stop at the point where it usually stops, may have his hands engaged with the paper which has been cut to remove it from the machine and might suffer injury from the knife if any unanticipated and continued movement of the cutting knife should occur.

The invention is defined in the appended claims and is to be considered comprehensive of all forms of structure coming within their scope.

We claim:

1. A device of the class described comprising, a driving member, means including a disengageable clutch for driving said driving member, a driven member actuated by the driving member, mechanism actuated by said driven member including a driving connection, automatic means for disconnecting said clutch when said driven member has completed one cycle of movement, automatic safety means to disconnect said driving connection when said driven member moves beyond said cycle of movement and means actuated upon engagement of said clutch to render said safety means temporarily ineffective.

2. A device of the class described comprising, a driving gear, means including a disengageable clutch for driving said driving gear, a driven gear driven by said driving gear, mechanism driven by said driven gear including a driving connection, means for disengaging said clutch when said driven gear has completed one revolution, automatic safety means for disengaging said driving connection when said driven gear moves more than one revolution and means actuated upon engagement of said clutch to render said safety means temporarily ineffective.

3. A device of the class described comprising, a driving gear, means including a disengageable clutch to drive said driving gear, a driven gear driven by said driving gear, mechanism driven by said driven gear, a driving connection between said driven gear and said mechanism, said driving connection rotating with said driven gear, an actuating member on said driving connection, a safety device including an element normally located in the path of said actuating member serving to disconnect said driving connection and means actuated upon engagement of said clutch to temporarily move said element out of the path of said actuating member until said actuating member has passed said element.

4. The elements in combination defined in claim 3, combined with means for moving said element into the path of said actuating member after said actuating member has passed said element.

5. A device of the class described comprising, a driven member, mechanism actuated by said driven member, a driving connection between said driven member and said mechanism, said driving connection moving with said driven member, actuating means on said driving connection, safety means including an element normally located in the path of said actuating means and adapted to disengage said driving connection when engaged by said actuating means and means normally operative to temporarily move said element out of the path of said actuating means.

6. A device of the class described comprising, a driven member, means including a clutch for driving said driven member, mechanism actuated by said driven member, a driving connection between said driven member and said mechanism, actuating means on said driving connection, safety means including an element normally located in the path of said actuating means and acting to disconnect said driving connection when engaged thereby, means actuated by engagement of said clutch to temporarily move said element out of the path of said actuating means and means for returning said element into the path of said actuating means after said actuating means has passed said element.

7. A device of the class described comprising, a driving member, means including a disengageable clutch for driving said driving member, a driven member actuated by said driving member, means for disengaging said clutch when said driven member has traveled a predetermined distance, mechanism rotating within and actuated by said driven member, safety means automatically rendering said driven member ineffective to drive said mechanism when said driven member has moved beyond said predetermined distance, and positive stop means automatically acting to stop said mechanism after said driven member has become ineffective.

8. A device of the class described comprising, a driving gear, means including a disengageable clutch for driving said driving gear, a driven gear driven by said driving gear, mechanism driven by said driven gear including a driving connection, means for disengaging said clutch when said driven gear has completed one revolution, automatic safety means for disengaging said driving connection when said driven gear moves more than one revolution, means actuated upon engagement of said clutch to render said safety means temporarily ineffective, and positive stop means acting to stop movement of said mechanism following disengagement of said driving connection.

9. A device of the class described comprising, a driven member, mechanism actuated by said driven member, a driving connection between said driven member and said mechanism, said driving connection moving with said driven member, actuating means on said driving connection, safety means including an element normally located in the path of said actuating means and adapted to disengage said driving connection and to positively stop movement of said mechanism when engaged by said actuating means and means normally operative to temporarily move said element out of the path of said actuating means.

10. In a device of the class described having driving means, driven means, mechanism operating normally with said driven means, and a clutch for actuating said driving means, safety means to render said mechanism inoperative including disengageable connecting means between said mechanism and said driven means and rotatable therewith, and a pivotally mounted element adapted to be disposed in the path of rotation of said connecting means after it has passed a predetermined point to disengage said connecting means whereby said mechanism will be positively stopped.

11. A device of the class described comprising, driving means, means including a disengageable clutch for driving said driving means, rotating means actuated by said driving means, mechanism rotatable with said rotating means, a driving connection between said mechanism and rotating means, and a pivotally mounted member adapted to disconnect said driving connection when the clutch remains engaged after one revolution of said rotating means.

12. In a device of the class described having driving means, a disengageable clutch to actuate said driving means, and rotating means actuated by said driving means, safety means comprising in combination mechanism rotatable with said rotating means, a driving connection between said mechanism and said rotating means, a plate normally disposed in the path of said driving connection, means associated with said clutch to remove said plate from the path of said connection when the clutch is moved to engaged position, and automatic means to replace said plate in the path of said connection after said connection has passed the normal position of the plate, whereby the driving connection will be disengaged from the rotating means after one revolution thereof to positively stop rotation of said mechanism.

13. A device of the class described comprising, a driving member, a disengageable clutch for driving said driving member, a driven member actuated by the driving member, mechanism actuated by said driven member including a driving connection, automatic means for disconnecting said clutch when said driven member has completed one cycle of movement, and automatic safety means to disconnect said driving connection when said driven member moves beyond said cycle of movement.

14. In a device of the class described, safety means comprising a driven gear, mechanism located within and rotatable with said gear, disengageable means connecting said gear and mechanism, means adapted to be interposed in the path of said connecting means after it has passed a predetermined point to disengage same whereby further rotation of said mechanism is positively stopped, means for removing said interposed means from the path of said connecting means during a portion of the first revolution of said mechanism, and other means for urging said interposed means in the path of said connecting means immediately upon completion of said portion of the first revolution of said mechanism.

FREEMAN BARNEY.
JAMES WESLEY LEE.